United States Patent
Lenz

(10) Patent No.: US 6,311,052 B1
(45) Date of Patent: Oct. 30, 2001

(54) PTT RADIO SYSTEM

(75) Inventor: Vernon C. Lenz, Union Gap, WA (US)

(73) Assignee: Golden West Communications, Inc., Union Gap, WA (US)

(*) Notice: Subject to any disclaimer, the term of this patent is extended or adjusted under 35 U.S.C. 154(b) by 0 days.

(21) Appl. No.: 09/291,449

(22) Filed: Apr. 13, 1999

(51) Int. Cl.[7] ................................................ H04M 3/42
(52) U.S. Cl. ...................... 455/305; 455/352; 455/345; 455/152.1
(58) Field of Search .............................. 455/15, 5.1, 352, 455/418, 419, 420, 31.1, 31.3, 39, 517, 519, 66, 151.2, 344, 345, 152.1

(56) References Cited

U.S. PATENT DOCUMENTS

| | | | |
|---|---|---|---|
| 3,644,883 | * 2/1972 | Borman et al. ....................... 340/23 |
| 3,916,312 | 10/1975 | Campbell . | |
| 4,060,697 | 11/1977 | Neal . | |
| 5,263,181 | * 11/1993 | Reed ............................... 455/152.1 |
| 5,282,238 | * 1/1994 | Berland .............................. 379/58 |
| 5,438,702 | 8/1995 | Jackson . | |
| 5,548,810 | 8/1996 | Riddell et al. . | |
| 5,610,387 | 3/1997 | Bard et al. . | |
| 5,689,802 | * 11/1997 | Luzzatto .............................. 455/11.1 |
| 5,734,643 | * 3/1998 | Rondeau .............................. 370/279 |
| 5,758,267 | * 5/1998 | Pinder et al. ......................... 455/90 |
| 5,771,303 | 6/1998 | Mazzarella et al. . | |
| 5,831,699 | * 11/1998 | Wright et al. ......................... 349/73 |
| 6,091,329 | * 7/2000 | Newman .............................. 340/539 |

* cited by examiner

Primary Examiner—William G. Trost
Assistant Examiner—Congvan Tran
(74) Attorney, Agent, or Firm—Leon D. Rosen

(57) ABSTRACT

A 2-way radio system for use by a driver of a vehicle such as a motorcycle, enables operation of the PTT (push-to-talk) switch to transmit voice communications, without requiring the driver to raise his/her hand to a PTT switch button on the 2-way radio and without requiring a cable connection. A self-contained separate PTT control unit (40) lies at the driver's finger for operation by the finger without taking the driver's hand off the steering bar (12). During operation, the unit transmits a short range radio signal (70) to a PTT receiver (90) on the 2-way radio to switch the radio to the transmit mode. The PTT control unit can be mounted on the driver's finger or on the steering bar.

10 Claims, 2 Drawing Sheets

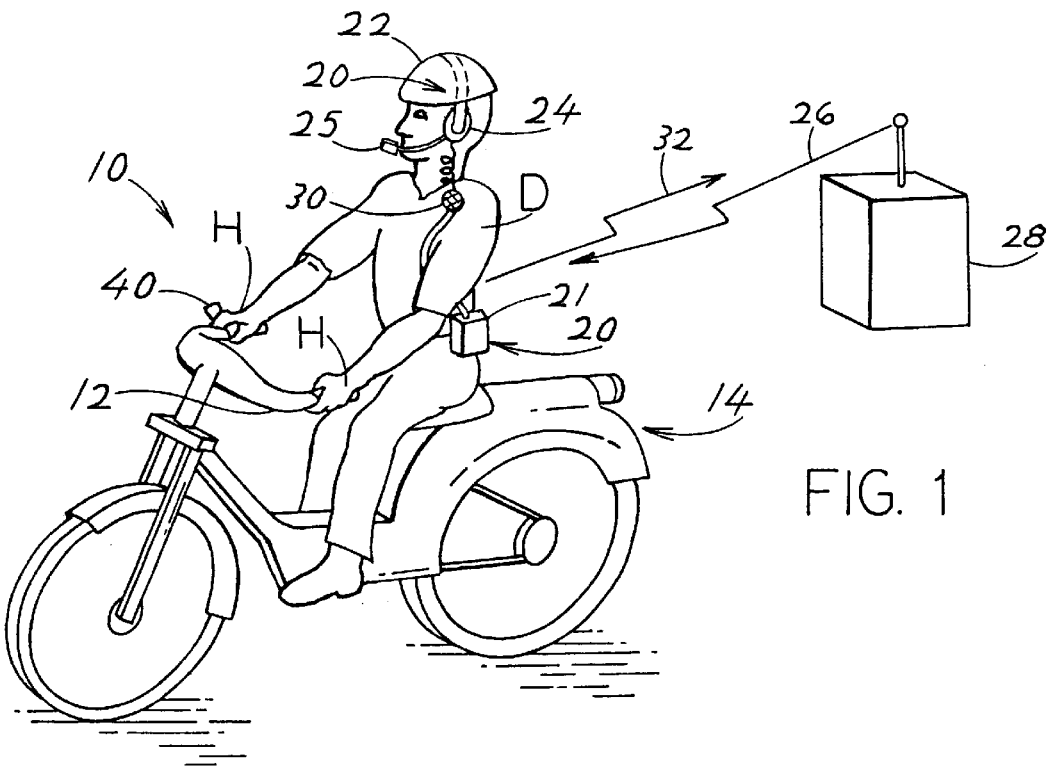
FIG. 1
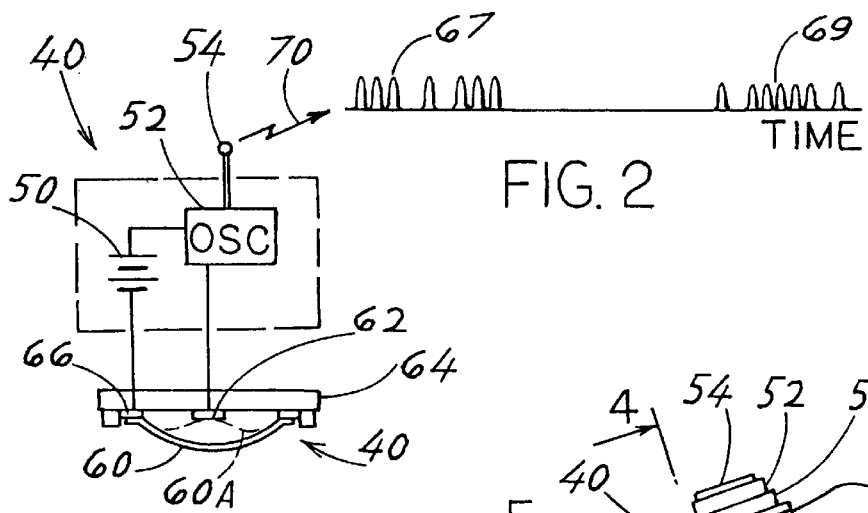
FIG. 2
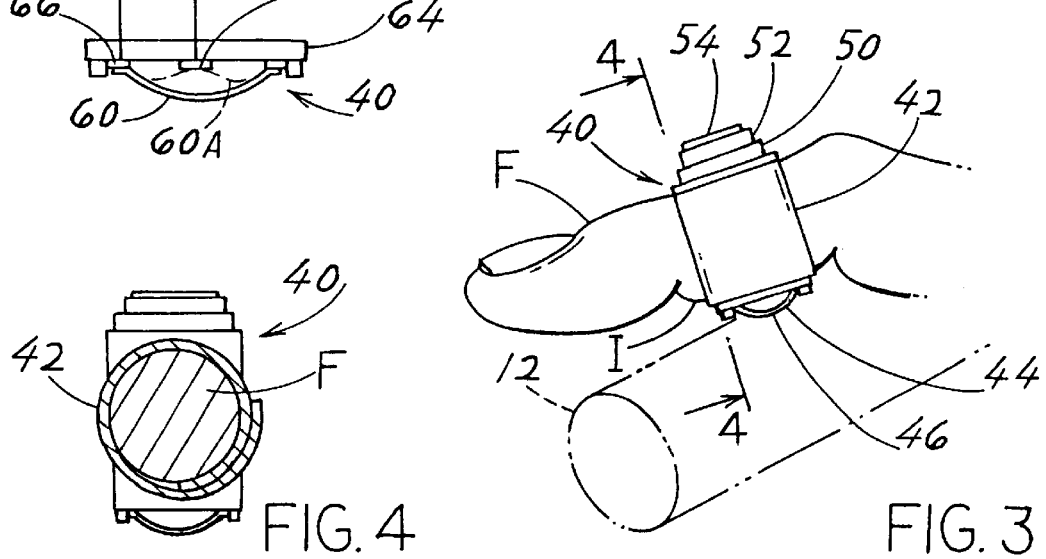
FIG. 4
FIG. 3

PTT RADIO SYSTEM

BACKGROUND OF THE INVENTION

A 2-way radio is usually constructed so it is always in a receive mode to receive signals that drive a speaker, except when a PTT (push-to-talk) switch is being activated. During the time when the PTT switch is actuated, the radio only transmits signals representing sound picked up by a microphone. The 2-way radio is commonly contained in a single case with a projecting antenna, so a person must lift his/her hand to reach the PTT switch on the case to depress it.

Drivers who drive vehicles under difficult conditions, such as a bicycle or motorcycle driver manipulating in heavy traffic, generally should not be encouraged to take his/her hands off the steering bar to press the PUT switch. Since the 2-way radio is commonly mounted on the driver's waist, one solution has been to extend a cord from the 2-way radio to a switch box mounted more conveniently on the person, such as on the person's chest, or in a vehicle such as a police car. This still requires the driver to take a hand off the steering bar and to find and depress the PTT switch. Also, the presence of a cable can add danger to the driver, as when the cable becomes snagged on a stationery object as the driver moves by. Apparatus for operating a 2-way radio to switch to a transmit mode, which avoided the need for the driver to take a hand off the steering bar to find and depress a switch, and which avoided the presence of a PTT cable extending from the radio, would be of value.

SUMMARY OF THE INVENTION

In accordance with one embodiment of the present invention, a radio system is provided for use by a vehicle driver, which enables the driver to switch and maintain the radio in the transmit mode by maintaining activation of a manual PTT (push-to-talk) switch, which avoids requiring the driver to take his/her hand off a steering bar and which avoids the need for a long cable extending from the radio. A PTT control unit includes a switch positioned for activation by a finger of the driver while the driver continues to hold the steering bar. The PTT control unit includes a transmitter that transmits a short range radio signal to a detector on the 2-way radio or located on a speaker microphone, to switch the 2-way radio to the transmit mode.

The PTT control can be mounted directly on the person's hand, with a manually-activatable switch lying at the inside of a finger of the driver. This allows the driver to operate the switch by pressing it firmly against the steering bar of a vehicle. Alternatively, the PTT control can be mounted on the steering bar of the vehicle with the switch positioned so it lies adjacent to a finger of the driver when the driver holds the steering bar during normal vehicle driving. This allows the driver to easily depress the switch without removing his/her hand from the steering bar.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of the radio system of the present invention, showing a 2-way radio mounted on a motorcycle drivers a control mounted on the driver's hand, and also showing a remote station.

FIG. 2 is a simplified schematic view of the PTT control of FIG. 1.

FIG. 3 is a side view of the PTT control of FIG. 2, shown worn on the finger of the vehicle driver.

FIG. 4 is a view taken on line 4—4 of FIG. 3.

DESCRIPTION OF THE PREFERRED EMBODIMENTS

Figure 5:
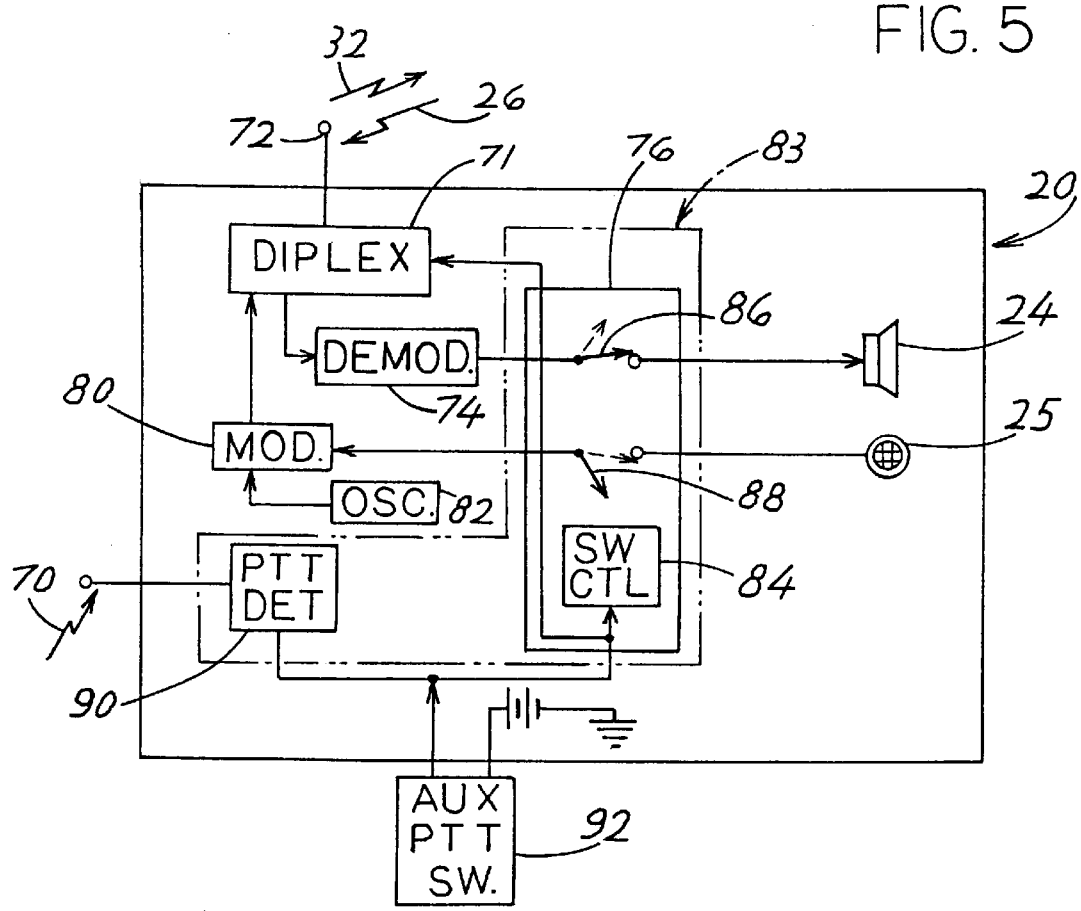
FIG. 5 is a block diagram of a 2-way radio of the system of FIG. 1.

FIG. 1 shows a radio system 10 for use by a vehicle driver D who has hands H lying on a steering bar 12 of a vehicle 14. The particular illustrated vehicle is a low power motorcycle or motor scooter, such as the type that is commonly used to drive through heavy traffic in cities. The radio system includes a 2-way radio 20 that includes a main part 21 mounted on the driver's waist and a speaker-microphone set 30 on the upper chest or on an epaulet of the driver. In some cases, a speaker 24 and microphone 25 of the type illustrated, are provided. The main part 21 may have a belt clip for mounting on the driver's belt. In any case, the main part 21 (and the microphone and speaker) are mounted away from the hands H of the driver, and usually away from the arms A of the driver. The speaker of the set 30 is energized by signals 26 transmitted by another station 28 which may be located more than one mile from the vehicle. The 2-way radio is normally in a receive mode, but can be temporarily switched to a transmit mode, wherein it receives voice signals from a microphone 30 and transmits radio signals 32 modulated by the voice signals picked up by the microphone of set 30, to the remote station 28.

The radio is of a type that has PTT (push-to-talk) capability; that is, it transmits signals representing those picked up by the microphone of set 30, only during the period when a PTT switch is being operated. In the past, the PTT switch was located on the 2-way radio main part 21 or on a speaker microphone attached to the radio. This would require the vehicle driver to take a hand off the steering bar, find the PTT switch, and keep that switch depressed so long as the driver wishes to talk. This can lead to dangerous conditions, because the driver may feel impelled to continue talking despite the need for both hands on the steering bar 12 to steer the vehicle through dangerous traffic.

In accordance with the present invention, applicant provides a PTT control unit 40 which is located on or beside one of the driver's hands H. FIG. 3 shows an example where the PTT control unit 40 is mounted on a finger F, such as the index finger, of the vehicle driver, by a finger mount in the form of a band 42 that encircles the index finger. The PTT control unit includes a switch 44 that is exposed at the inner inside I of the person's finger, with the exposed area 46 lying close to the steering bar 12 of the vehicle. The driver can press the exposed switch activating area 46 against the steering bar 12 to operate the switch while keeping his/her hand on the steering bar 12. When the switch is operated, it allows a battery 50 to energize a very small and short range radio transmitter 52 which transmits, through an antenna 54, a PTT signal which is detected by the main part 21 of the 2-way radio to switch it. The frequency of the radio output of the unit 40 is preferably different from that of the remote station.

FIG. 2 shows that the switch 44 includes a snap dome 60 which can be depressed by firm pressure (e.g. a force of 2 pounds) until it snaps to the position 60A wherein it contacts a trace 62 on a circuit board 64 until the continuing pressing force (e.g. ½ pound) is removed. The periphery of the dome engages another trace 66 on the circuit board. When the circuit is closed by depressing the dome to position 60A, it allows current from the battery 50 to flow through the oscillator transmitter 52, so the oscillator-transmitter 52 generates a radio frequency PTT signal 70 that is transmitted by the antenna 54.

The PTT control unit 40 is a very short range radio transmitter, which may be similar to the type commonly found on keychains to lock and unlock vehicle doors and alarms, or to open garage doors or gates. However, the unit 40 requires a range of no more than one meter. A wide variety of circuits can be used, including a circuit that transmits a pulse when the switch 44 is first closed, and which delivers a different pulse when the switch is opened, to conserve the power of the battery during the period when the driver is transmitting his speech. In FIG. 2, the group of pulses 67 indicates the beginning of a switch to the transmit mode while the group 69 represents the end of the transmission. The output of the transmitter oscillator 52 may include signals at a few frequencies or modulated signals that represent a code.

FIG. 5 is a simplified view of the circuitry of the 2-way radio 20 that is mounted on the vehicle driver's helmet. The radio has a diplex 71 that can transmit and receive over the same antenna 72. In the receive mode, which the radio is usually in, signals from the diplex 71 are demodulated by a demodulator circuit 74, to produce audio frequency signals. The audio signals are transmitted through a PTT-controlled switch 76 and energize a speaker 24 of a headphone (or the speaker of a speaker microphone set) that can be heard by the vehicle driver. When the PTT-controlled switch is switched to the transmit mode, voice signals detected by the microphone 25 are transmitted through the switch 76 to a modulator 80 which modulates the output of an oscillator 82 according to the voice signals. The modulated signals drive the diplex 71, so as to transmit signals to another station. Most of the circuitry of the 2-way radio such as the antenna 72, diplex, various amplifiers (not shown) and a battery, are mounted on the main part 21 of the radio.

The 2-way radio includes PTT circuitry 83 by which the remote PTT control unit 40 determines the state of the 2-way radio. The circuitry includes the PTT-controlled switch 76 and a PTT detect circuit 90. The PTT-controlled switch 76 includes a switch control 84 that controls two switch parts indicated at 86 and 88. When the PTT detect circuit, or radio receiver circuit 90, receives a first PTT signal 70 from the PTT control unit 40 of FIGS. 2 and 3, the PTT detect circuit 90 delivers a signal to the switch control 84 to switch the PTT-controlled switch part 76 to the transmit mode, wherein the switch 88 is closed and the other one 86 is opened. Also, the diplex 70 is switched. It is noted that an auxiliary PTT switch 92 can be provided, so that if the PTT control unit 40 is not operating, the driver can still transmit signals to the remote station.

The use of a very low powered radio transmitter in the PTT control unit 40 enables control of the 2-way radio while the vehicle driver D keeps both hands on the steering bar 12. The use of a radio transmitter in the PTT control unit, avoids the need for a cable to extend from the 2-way radio 20 to the PTT control 40 on the hand of the driver. Such a cable, with a length of more than one-half meter, would present a danger to the driver, where the driver is directly exposed to the environment, as in the case of a motorcycle or bicycle. Although such a cable may be tied at several places to the driver's body, there is a possibility that a length of the cable will become loose and could snag on objects in the environment, creating danger for the driver. Also, such a cable would be cumbersome. By eliminating such a cable, applicant provides a remote control without introducing such hazard.

There are a large number of vehicles in situations where a vehicle driver should keep both hands continually on the steering bar. Motorcycle and bicycle riders whose steering bar may be referred to as a handlebar, especially those who travel through crowded city streets or policemen while chasing a vehicle, are examples. Drivers of race vehicles or police cars, where the steering bar may be curved to form a "steering wheel" provide another example, whether the vehicle travels on land or is a boat that travels on water. Operators of other equipment also may require both hands on a steering bar while answering a call.

Figure 6:
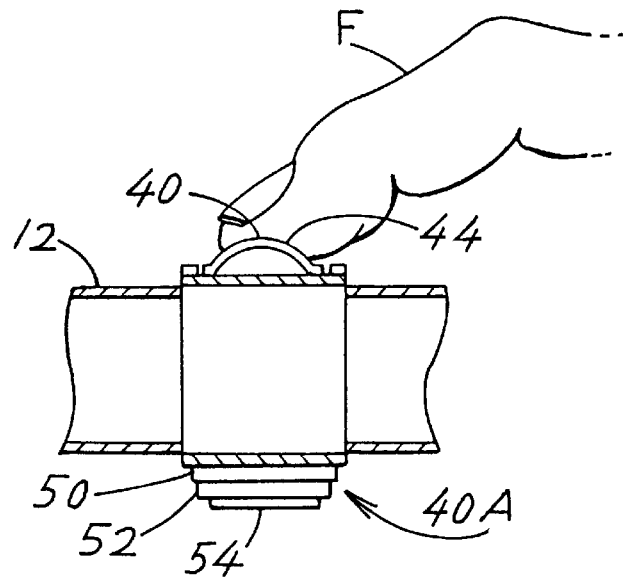
FIG. 6 is a side view of the PTT control of FIG. 3, but shown mounted on a vehicle steering bar.

In FIG. 3, the vehicle driver can mount the PTT control unit 40 on a finger such as an index finger, and can continue to grasp the steering bar 12 with his thumb and other fingers. The driver can press the index finger so the exposed switch actuation area 46 is pressed against the steering bar to operate the switch 44. FIG. 6 shows another mounting arrangement, where the PTT control 40A has been mounted on the steering bar 12. In that case, the driver's finger F is used to push against the exposed switch actuation area 46 by pressing the driver's finger against the switch 44. FIG. 6 shows the tip of the finger pressing against the switch area 46, although other joints of the finger can be used, such as the joint closest to the palm (especially if the driver wears a ring) or the middle joint of the finger. In actuality, a flexible covering can be used to cover the switch 44 to prevent corrosion and damage, with an additional cover over the battery 50, transmitter 52 and antenna 54. There is some advantage is mounting the PTT control 40A on the steering bar 12, in that it avoids weight on the driver's hand. However, applicant generally prefers that the control be mounted on the driver's finger, as in FIG. 3, so the switch is available to be operated even when the driver leaves the vehicle or is operating other controls of the vehicle. Most fingers and steering bars have a diameter of about one inch (0.5 inch to 2 inches), and the strap-like mount 56 in FIG. 6 and 42 in FIG. 3 are constructed to mount on such a cylindrical object.

Thus, the invention provides a radio system for use by a vehicle driver, which includes a 2-way radio having PTT (push-to-talk) capability, which enables the driver to switch to the transmit mode while keeping his/her hands on the steering bar even though the radio is (the main part 21) mounted more than a foot away form the hands such as on the driver's waist, and without the danger and cumbersomeness that a cable connection to a remote PTT switch would entail. This is accomplished by providing a PTT control unit that can be mounted to lie adjacent to the fingers of one of the driver's hands when the driver is grasping a steering bar of the vehicle, with the PTT control unit constructed to transmit a radio PTT signal to the 2-way radio to switch the radio to the transmit mode. The PTT control unit is preferably mounted on a driver's finger, although it can be mounted on the steering bar of the vehicle.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A radio system for use by a vehicle driver who has his/her hands on a steering bar of the vehicle, comprising:

a 2-way radio that includes a microphone and speaker, and that normally is in a receive mode but which can be switched to a transmit mode to transmit at a first radio frequency and that has PTT (push-to-talk) circuitry;

a PTT control unit which includes a switch positioned for manual activation by the driver's hand and a short range radio PTT transmitter which transmits a PTT signal when said switch is manually activated, with said PTT circuitry on said 2-way radio including a radio receiver circuit that operates said PTT circuitry to place said 2-way radio in said transmit mode when said radio receiver circuit receives a radio PTT signal from said short range radio PTT transmitter;

said PTT control unit has an exposed switch-activation area and said PTT control unit includes a finger mount constructed to mount on one of the driver's fingers with said switch-activation area exposed and constructed to be activated when that driver's finger is pushed against the vehicle steering bar.

2. The apparatus described in claim 1 including:

a manually operable auxiliary switch mounted on said 2-way radio and connected to said PTT circuitry to place said radio in said transmit mode when said auxiliary switch is manually operated.

3. A PTT radio system for use by a driver of a vehicle that has a steering bar, to communicate with a remote station, comprising:

a 2-way radio which includes a microphone, a speaker and an antenna, for wearing by the driver, where said 2-way radio can be switched from a receive mode to receive voice signals and energize said speaker, and to a transmit mode to transmit voice signals detected by said microphone;

a PTT control unit that has a manually actuatable switch and a radio transmitter that is constructed to transmit PTT signals when said switch is activated;

said 2-way radio has a PTT circuit which switches said 2-way radio from said receive mode to said transmit mode when said PTT circuit detects said PTT signals;

said PTT control including a flexible band that is constructed to be wrapped about said steering bar to mount therein, with said switch having an exposed actuator.

4. The system described in claim 3 including said vehicle and driver, and wherein:

said PTT control unit has a mount in the form of a band that is mounted on a finger of the driver.

5. The system described in claim 3 including said vehicle and driver, where said vehicle is a bicycle or motorcycle which has a handlebar, and wherein:

said PTT control unit has a mount in the form of a band mounted on said handle bar of said vehicle.

6. Apparatus for use by a driver who holds a vehicle steering bar, for operating a 2-way radio that includes a microphone and speaker, where the 2-way radio is normally in a receive mode to receive radio waves modulated by signals that energize said speaker to generate sounds, but which can be switched to a transmit mode to transmit radio waves representing sounds detected by said microphone when said 2-way radio receives a PTT (push-to-talk) signal, comprising:

a PTT control unit that has a manually actuatable switch and a flexible finger band that encircles one of said driver's fingers, with said switch exposed so said one finger can be pressed against the steering bar to actuate said switch, said PTT control unit having a short range radio transmitter that transmits a PTT signal when said switch is actuated.

7. A method for operating a 2-way radio that includes a microphone and speaker, and that is worn by a person who is a driver that rides and steers a vehicle with a steering bar, where the 2-way radio normally receives radio signals and uses them to energize said speaker, but said 2-way radio switches to a transmit mode to transmit radio signals representing sounds detected by said microphone when it receives a PTT signal, comprising:

constructing said 2-way radio so it can receive a radio signal that represents a PTT signal, and so upon such receipt said 2-way radio switches to said transmit mode;

mounting on said driver, a PTT control unit, which includes a short range radio transmitter and a manually operable switch, where said short range radio transmitter transmits a PTT signal to switch said 2-way radio to a transmit mode when said manually operated switch is actuated, including mounting said switch on a finger of the driver and pressing said finger toward the steering bar of the vehicle to press said switch against said steering bar to actuate said switch.

8. A method for operating a 2-way radio that includes a microphone and speaker, and that is worn by a person who is a driver who rides and steers a two-wheel vehicle by moving a handlebar of the vehicle, where the 2-way radio normally receives radio signals and uses them to energize said speaker, but said 2-way radio switches to a transmit mode to transmit radio signals representing sounds detected by said microphone when it receives a PTT signal, comprising:

constructing said 2-way radio so it can receive a radio signal that represents a PTT signal, and upon such receipt thereof said 2-way radio switches to said transmit mode;

mounting on said vehicle, a PTT control unit, which includes a short range radio transmitter and a manually operable switch, where said short range radio transmitter transmits a PTT signal to switch said 2-way radio to a transmit mode when said switch is actuated, including mounting said switch on said handlebar and pressing a finger of said driver toward said switch on the handlebar of the vehicle to actuate said switch, and upon actuation of said switch transmitting a wireless radio signal from said PTT control unit on said handlebar to said 2-way radio on the person, with said radio signal switching said 2-way radio to a transmit mode.

9. A radio system for use by a vehicle driver who has his/her hand on a handlebar of a two-wheel vehicle, comprising:

a 2-way radio that includes a microphone and speaker, and that normally is in a receive mode but which can be switched to a transmit mode to transmit at a first radio frequency and that has PTT (push-to-talk) circuitry;

a PTT control unit which includes a switch positioned for manual activation by the driver's hand and a short range radio PTT transmitter which transmits a PTT signal when said switch is manually activated, with said PTT circuitry on said 2-way radio including a radio receiver circuit that operates said PTT circuitry to place said 2-way radio in said transmit mode when said radio receiver circuit receives a radio PTT signal from said short range radio PTT transmitter;

said steering bar is a handlebar of a vehicle, where said handlebar has two laterally spaced bars each for grasping by a hand of the driver, and said PTT control unit is constructed to mount on of said handlebars and to be activated when the driver's finger is pushed against said switch.

10. Apparatus for operating a 2-way radio that includes a microphone and speaker and that is worn by a person who is a driver who rides and steers the vehicle by moving a handlebar of the vehicle, where the 2-way radio normally receives radio signals and uses them to energize said speaker, but said 2-way radio switches to a transmit mode to transmit radio signals representing sounds detected by said microphone when it receives a PTT signal, wherein:

said 2-way radio can receive a radio signal that represents a PTT signal, and upon such receipt thereof said 2-way radio switches to said transmit mode; and including a PTT control unit which includes a short range radio transmitter that transmits a PTT signal by wireless radio signals to switch said 2-way radio to a transmit mode when said switch is actuated, said switch is mounted on said handlebar to enable a driver of said vehicle to actuate said switch to transmit a wireless radio signal from said PTT control unit on said handlebar to said 2-way radio to switch said 2-way radio to a transmit mode.

* * * * *